Oct. 3, 1933.                G. LASCO                1,929,174
                        AIR BRAKE RELEASE VALVE
                        Original Filed Oct. 5, 1928
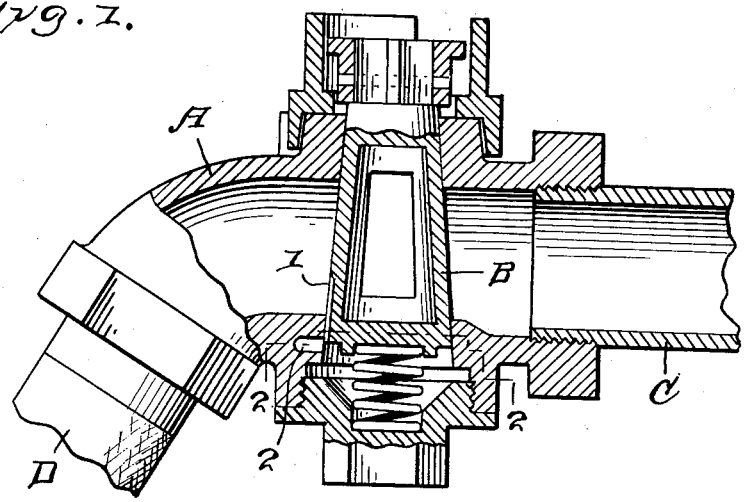
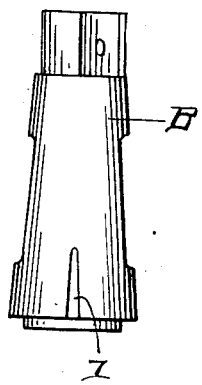
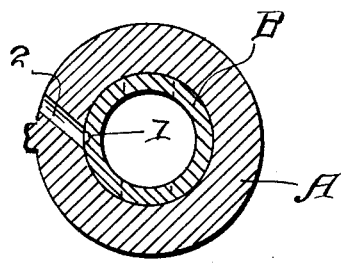
George Lasco
INVENTOR
BY Victor J. Evans
ATTORNEY Patented Oct. 3, 1933

1,929,174

UNITED STATES PATENT OFFICE 1,929,174

AIR BRAKE RELEASE VALVE

George Lasco, Pittston, Pa.

Application October 5, 1928, Serial No. 310,593
Renewed March 6, 1933

1 Claim. (Cl. 251—104)

This invention relates to air equipment for railway cars, and its general object is to provide a coupling pipe angle cock that includes a bleed port to release the air pressure from the hose between the railway cars when the cock is closed.

A further object of the invention is to provide a coupling member angle cock with a bleed port that acts as a signalling means when the cock is closed, as the passage of air from the port provides a noise that indicates to a casual observer that the cock is closed. This bleed port is disposed in such a manner that the air vented does not strike the operator.

This invention also consists in certain other features of construction and in the combination and arrangement of the several parts, to be hereinafter fully described, illustrated in the accompanying drawing and specifically pointed out in the appended claim.

In describing my invention in detail, reference will be had to the accompanying drawing wherein like characters denote like or corresponding parts throughout the several views, and in which:

Figure 1 is a fragmentary sectional view taken through the angle cock with the bleed port therein.

Figure 2 is a sectional view taken approximately on line 2—2 of Figure 1.

Figure 3 is a detail view of the cock core or key illustrating the arrangement of the groove therein which forms a part of the bleed port.

Referring to the drawing in detail, the letter A indicates the body of an angle cock, B the core or key thereof, C an air pipe having secured thereto the body of the cock and D the air hose that is provided with a coupling member on the end, not shown, for the purpose of cooperating with a similar coupling on the hose of an adjacent car.

The angle cock as shown is of the usual construction, with the exception that the key or core B is formed with a longitudinally disposed groove 1 arranged in one side thereof at the enlarged end and between the oppositely disposed air ports of the core or key as shown. The groove is of tapered formation with its small end uppermost, while the large end of the groove extends through the bottom edge of the core or key.

Formed in the lower portion of the body and arranged in the path of the enlarged lower end of the groove is one end of a bore 2 while its opposite end extends to the outer side of the body to the atmosphere as shown in Figure 2. It will be seen that on account of the disposition of said vent the air vented therefrom would be directed away from the operator.

From the above description and disclosure of the drawing, it will be obvious that when the cock is closed as shown in Figures 1 and 2, the groove 1 is disposed in registration with the bore 2, with the result the air in the hose between the cars will exhaust through the bleed port formed by the groove 1 and bore 2.

The forming of the bleed port in the angle cocks as disclosed eliminates danger of damage and injury to parts of the coupling and to the person, as it will be apparent that when the angle cocks of cooperating hose sections are closed, after air has been passed therethrough, the air between the angle cocks and in the hose thereof will be of great pressure, but this pressure will be reduced by leakage through the bleed ports and therefore the couplings can be disconnected without fear of damage or injury.

In the event the forward angle cock between the cars of a train is closed, and the adjacent angle cock is open, air will escape through the bleed port of the closed angle cock with the result the brakes will be applied to the cars to the rear of the closed angle cock, therefore the train cannot leave until the closed angle cock is opened.

It will of course be understood that the passage of air through the bleed ports will provide a noise which will indicate to the casual observer that the cock is closed, with the result the bleed port acts as a signalling means to indicate the position of the angle cock.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

An air brake release valve comprising a hollow body having one end connected to an air pipe and the opposite end connected to an air coupling hose and said body having a tapered bore with the smaller end disposed uppermost, and a tapered core in said bore and having oppositely disposed air ports to control the air through the body, said body having a passage extending laterally at a substantially acute angle with respect to said pipe to the atmosphere, said core having a tapering groove between the ports and extending longitudinally of the core and having the smallest end always in communication with the interior of the body adjacent the hose and adapted to have the largest end in communication with the passage of the body when the plug is positioned to close the body against the passage of air through the body from the air pipe end thereof to bleed the hose of air pressure.

GEORGE LASCO.